Feb. 2, 1960     S. E. WESTMAN     2,923,153
PRESSURE RATIO MEASURING INSTRUMENT
Filed Jan. 11, 1954     4 Sheets-Sheet 1
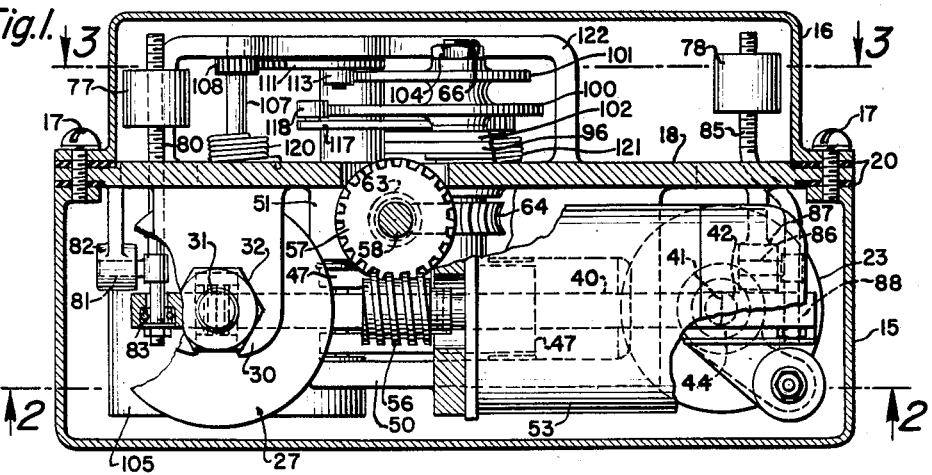
SYDNEY E. WESTMAN,
INVENTOR.
BY

SYDNEY E. WESTMAN,
INVENTOR.

BY John H.J. Wallace

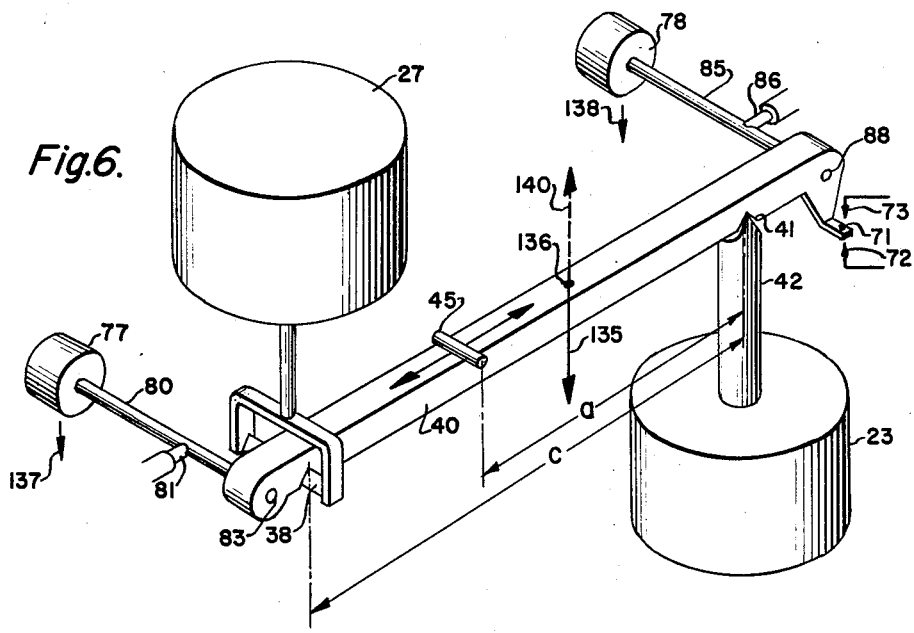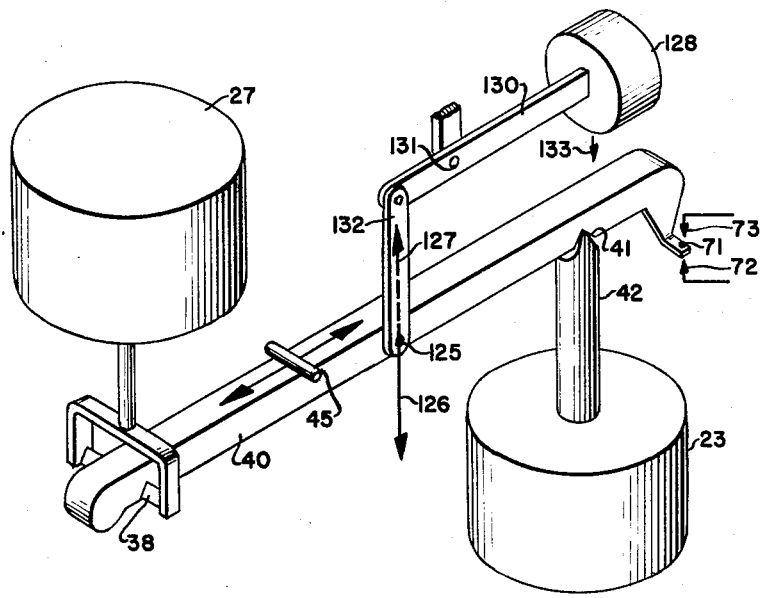

Feb. 2, 1960 S. E. WESTMAN 2,923,153
PRESSURE RATIO MEASURING INSTRUMENT
Filed Jan. 11, 1954 4 Sheets-Sheet 4

SYDNEY E. WESTMAN,
INVENTOR.

BY John H.G. Wallace

United States Patent Office 2,923,153
Patented Feb. 2, 1960

2,923,153

PRESSURE RATIO MEASURING INSTRUMENT

Sydney E. Westman, Inglewood, Calif., assignor to The Garrett Corporation, Los Angeles, Calif., a corporation of California Application January 11, 1954, Serial No. 403,135

8 Claims. (Cl. 73—182)

This invention relates generally to force-ratio measuring instruments, and particularly relates to an air pressure ratio transducer.

Force-ratio measuring instruments are generally known. Such instruments may be used for measuring the ratio of certain pressures such, for example, as the ratio of the total pressure of ambient air to the static pressure of ambient air. Essentially, this pressure ratio determines the Mach number, which may be defined as the ratio of the speed of an aircraft to the speed of sound in the ambient air. In modern aircraft it is frequently desirable to measure the Mach number and either to indicate the Mach number directly or to utilize the information for computing other air data. It has previously been suggested to measure such a pressure ratio by means of a beam to the ends of which are connected two bellows or the like which are subject to the pressures to be measured. The beam may be provided with a travelling fulcrum point or pivot and with means for moving the pivot in response to unbalance of the beam due to variations of the pressures to be measured so as to rebalance the beam. Such an instrument for measuring a pressure ratio may be utilized for indicating or for computing the Mach number.

Since a pressure ratio transducer of this type is mounted in an aircraft or other moving vehicle, it is subject to linear acceleration which would tend to unbalance the beam because its pivot moves as a function of pressure variations. If the instrument had a fixed pivot, it would, of course, be very easy to arrange the beam in such a manner that its center of gravity coincides with its pivot point, and in that case linear acceleration would not change the position of the beam. However, with an instrument having a moving pivot point, this is obviously not possible. Yet, to obtain a proper indication of the pressure ratios to be measured, the instrument should not become unbalanced due to the effect of acceleration.

In some cases it is desirable to obtain from a pressure ratio transducer of the type referred to an output voltage which is a function of the ratio of the total pressure to the static pressure of the ambient air which, in turn, may be considered to be a function of the Mach number. Such an output voltage may be applied, for example, to an analogue computer for computing various data which vary with the characteristics of the ambient air.

It is, accordingly, an object of the present invention to provide an improved instrument for measuring force ratios such, for example, as the ratio of the total pressure of the ambient air to the static pressure of the ambient air.

Another object of the invention is to provide a force-ratio transducer of the type having a force balancing beam with a travelling pivot, and which is substantially insensitive to the effect of linear acceleration.

A further object of the invention is to provide a transducer or measuring instrument for developing an output voltage representative of a function of the Mach number obtained from the measured ratio of the total pressure to the static pressure of ambient air.

In accordance with the present invention, the effects of linear acceleration on a force-ratio measuring instrument, such as a pressure ratio transducer, are substantially eliminated by the provision of a suitable counterweight or counterweights. The counterweight is connected to the force measuring beam of the instrument in such a manner that the counterweight produces, in response to linear acceleration, a force vector which substantially counteracts or cancels the force vector produced by the beam system itself without the counterweight in response to the same linear acceleration. Hence, the counterweight acts on the center of gravity of the system and will always produce a force vector of substantially the same magnitude and of opposite direction as the force vector produced by the instrument itself in response to linear acceleration. Consequently, regardless of the direction of the linear acceleration, its effect will always be substantially neutralized regardless of the position of the movable pivot of the force balancing beam.

The instrument of the invention may also be provided with one or more cams shaped in accordance with a predetermined function of the pressure ratio being measured. These cams will be positioned in accordance with the relative position of the movable pivot of the force measuring beam, and may be utilized to control potentiometers for developing an output voltage which is a function of the measured pressure ratio. Such an output voltage may, for example, be utilized in computing the true angle of attack from the indicated or measured angle of attack.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Fig. 1 is a vertical sectional view taken on line 1—1 of Fig. 2 of the pressure ratio transducer of the invention;

Fig. 2 is a bottom plan sectional view of the transducer of the invention taken on line 2—2 of Fig. 1;

Fig. 5 is a schematic isometric view illustrating the force measuring beam and the bellows of the transducer, and mechanism in accordance with the invention for rendering the instrument insensitive to the effect of linear acceleration;

Fig. 6 is an isometric view, similar to Fig. 5, illustrating a modified mechanism in accordance with the invention for neutralizing the effect of linear acceleration on the transducer of Figs. 1 to 5;

Figure 3:
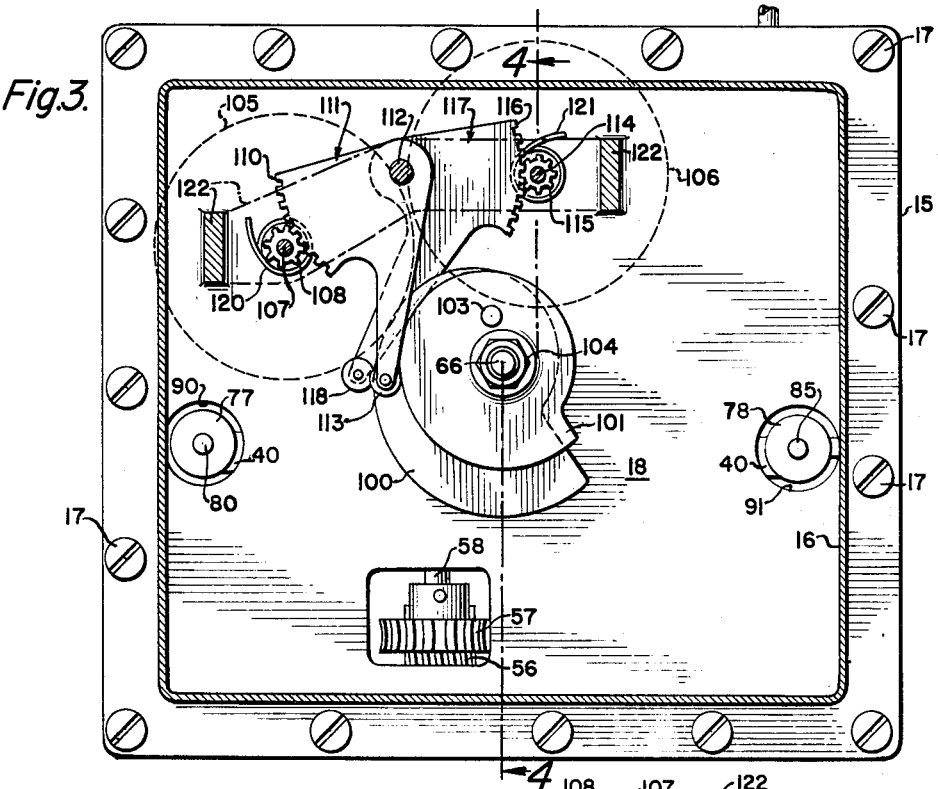
Fig. 3 is a top plan sectional view taken on line 3—3 of Fig. 1.
Figure 4:
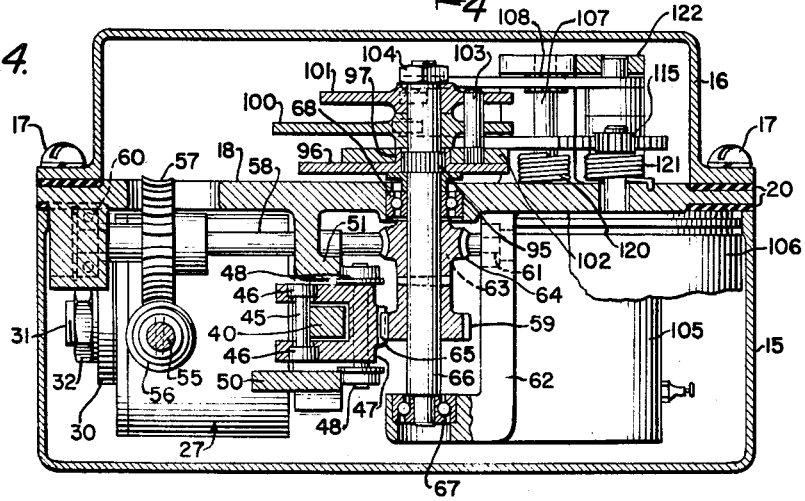
Fig. 4 is a cross sectional view taken on line 4—4 of Fig. 3.

Referring now to the drawings, wherein like elements have been designated by the same reference characters, and particularly to Figs. 1 to 4, there is illustrated a pressure ratio transducer for measuring the ratio of the total pressure ($P_t$) of the ambient air to the static pressure ($P_s$) of the ambient air. These pressures may be measured by a Pitot tube 10 having a central opening 11 for sensing the total ambient pressure and radial openings 12 for sensing the static pressure. The central opening 11 communicates with a flexible tube 13, while the radial slot 12 communicates with a flexible tube 14 for transmitting respectively the total and the static pressure. The tubes 13 and 14 should be flexible enough to permit mounting of the housing on shock mounts, not shown. The instrument proper comprises a housing having a lower portion 15 and an upper portion 16 of a smaller size, the two housing portions being connected by screws 17. A dividing plate or supporting shelf 18 may be provided between the lower and upper housing portions and the whole assembly may be sealed by rubber gaskets 20 so as to be airtight. The tube 14 which transmits the static air pressure is connected to the interior of the housing, as shown at 21, and it will be understood that a suitable fitting may be provided for connecting the tube to the housing. The tube 13 transmitting the total pressure extends through the lower housing portion 15 into the interior of a bellows 23.

Accordingly, the bellows 23 is subjected to the difference of the total and the static air pressures. The bellows 23 has a fitting 24 to which the tube 13 is connected, for example, by sweating or soldering. The fitting 24 may be externally threaded as shown, and passes through a supporting lug 25, which extends from the shelf 18. The bellows 23 may be locked against lug 25 by a lock nut 26. The lower housing portion 15 is further provided with an evacuated bellows assembly 27, which is accordingly subjected only to the static pressure. The bellows assembly 27 is provided with an outer casing 28 which is rigidly supported by a supporting lug 30 extending from the shelf 18. A threaded stud 31 extends through lug 30 and may be locked by the lock nut 32. Disposed within the outer casing 28 is a flexible bellows 33 which bears a plate 34 having a central stud 35 into which is threaded a bolt 36. The free end of the bolt 36 is threaded into a member 37 of generally U-shape which is provided with a knife edge 38.

The knife edge 38 engages a beam 40 which serves to measure the force ratio, that is the pressure ratio, of the two air pressures.

The bellows 23 is connected to the other end portion of the beam 40 by means of a knife edge 41 provided at the end of a rod 42 adjustably threaded into bellows 23, and which may be locked by lock nut 43. The rod 42 is journaled in a linear bearing 44 of conventional construction, hence it is permitted to reciprocate but is held against lateral or tilting movements. By virtue of this construction, movement of the beam 40 along its longitudinal axis is prevented. The bearing 44 is rigidly secured to the shelf 18. Hence, it will be seen that the bellows 23 pushes upward on the right hand end of beam 40, as viewed in Fig. 2, while the bellows 27 exerts a force in the upward direction on the left hand portion of the beam.

The beam 40 has a traveling fulcrum or pivot which is represented by a rotating shaft 45, in the nature of a roller. The shaft 45 is pivoted in ball bearings 46 which are provided in a carriage 47 which is arranged to reciprocate with respect to the beam 40. To this end the carriage 47 is provided with two pairs of flanged wheels 48 which are supported by rails 50 and 51 integral with the horizontal shelf 18. Accordingly, when the carriage 47 is caused to move or shift, it will roll along the rails 50 and 51 to change the location of the pivot of the beam 40.

The carriage 47 is driven by an electric motor 53 which is rigidly secured to the housing 15 by means of screws 54. The electric motor 53 has a drive shaft 55 to which is secured a worm 56 which meshes with a worm gear 57 on a shaft 58. The shaft 58 has one end supported in a ball bearing 60 fixed to shelf 18, while its opposite end is journaled at 61 in a supporting lug 62 integral with the shelf 18. The other end of the shaft 58 is provided with a worm 63 which meshes with a worm gear 64. The worm gear 64 is secured to a carriage control shaft 66 which bears a gear 59. The gear 59 in turn engages a rack 65 on the carriage 47. The control shaft 66 has one end supported by a bearing 67 provided in the supporting lug 62, while its other end is supported in a bearing 68 provided directly in the dividing shelf 18. It will be noted that the shaft 66 extends through the shelf into the upper housing portion 16.

The beam 40 is provided at its right end portion, as viewed in Fig. 2, with an extension 70 secured to the beam by screws 69 and having a switch portion or movable switch contact 71 bent substantially at right angles to the beam. The movable switch contact 71, accordingly, moves between a pair of adjustable fixed contacts provided by screws 72 and 73, which extend through brackets 74 and 75, respectively, forming part of the housing. The screws 72 and 73 may be adjusted and locked as is conventional to provide fixed switch contacts cooperating with the movable switch contact 71 for controlling the motor 53 as will be more fully described hereinafter.

As long as the beam 40 is balanced, the movable switch contact 71 will be disposed between its fixed contacts 72 and 73; however, when the beam becomes unbalanced due to a change of the ratio of the total pressure to the static pressure, the movable switch contact 71 will engage either the fixed contact 73 or the fixed contact 72. In a manner to be more fully explained hereinafter, this will cause energization of the electric motor 53 in a selected direction of rotation. Consequently, the motor 53 will rotate worm 56 in engagement with worm gear 57 to rotate the shaft 58. Rotation of shaft 58 will cause rotation of worm 63 which engages worm gear 64 and, hence, reciprocates carriage 47. Thus the shaft 45, which provides the pivot for the beam, will be shifted until the beam is balanced again.

Since the pressure ratio measuring instrument of the invention is intended for use in an aircraft, it is subject to linear acceleration which might cause unbalance of the beam 40 without variation of the total or static air pressures. In accordance with the present invention, the pressure ratio transducer is made insensitive to the effect of linear acceleration by the provision of a pair of counterweights 77 and 78. These counterweights are linked to the beam 40 by a lever arrangement in such a manner as to counteract or neutralize the force vector produced by the instrument in response to linear acceleration. To this end the counterweight 77 is adjustably threaded onto a rod 80 which bears a pin 81 journaled to an extending portion 82 forming part of or secured to the supporting shelf 18. The free end of the rod 80 is pivoted in a self-aligning ball bearing 83 provided in one end of the beam 40. Accordingly, a tilting movement between the rod 80 and the beam 40 about the pivot point 81, 82 is permitted. The counterweight 78 is adjustably threaded onto a rod 85 which may be curved, as shown, and which also has a fixed pivot point 86 in another portion 87 depending from the shelf 18. The other end of the rod 85 is connected to the beam 40 by a self-aligning bearing 88. The two rods 80 and 85 extend through the shelf 18 through suitable openings 90 and 91 respectively.

The pressure ratio transducer, as described thus far, will measure the ratio of the total pressure to the static pressure of the ambient air. Further, in accordance with the present invention, this pressure ratio is indicated in the form of an electric output voltage representative of a function of the measured pressure ratio. To this end the carriage control shaft 66, which directly drives the carriage 47 through the gear 59 and rack 65, is utilized for positioning two cams which are shaped in accordance with a predetermined function of the pressure ratio. The shaft 66 extends through the intermediate shelf 18 into the upper housing portion 16 and is provided with a splined portion 95, over which fits an internally splined disc 96 having a sleeve 97. The two cams 100 and 101 fit loosely over the upper portion of the shaft 66 and are secured together and to another disc 102 which bears against the sleeve 97 of disc 96 by a locating pin 103.

Hence, the cams 100 and 101 with the disc 102 form a unit or assembly which is locked by the pin 103. This assembly is then adjusted with respect to the shaft 66. The two discs 96 and 102 are then locked by a lock nut 104 secured to the threaded outer end of shaft 66 which presses the cams and the disc 96 against the disc 102.

The two cams 100 and 101 are arranged to position respectively the movable sliders of two potentiometer assemblies 106 and 105, which may each be provided with three output terminals, as shown in Fig. 2. The potentiometer assembly 105 is provided with a shaft 107 which positions the movable slider thereof, and bears a pinion 108. The pinion 108 meshes with a gear segment 110 of a lever 111 mounted on a shaft 112 and having a cam follower 113 including a roller in engagement with the cam surface of cam 101. Similarly, potentiometer assembly 106 has a shaft 114 for positioning its movable slider which bears a pinion 115. The pinion 115 is in engagement with a gear segment 116 of a lever 117 also mounted on the shaft 112 and having a cam follower roller 118 in engagement with the cam surface of cam 100. A spring 120 is secured to the potentiometer assembly 105 and urges the pinion 108 in a clockwise direction to urge cam follower 113 against its cam 101. Similarly, the spring 121 is secured to the potentiometer assembly 106 and urges pinion 115 in a clockwise direction which will force the cam follower 118 against its cam 100. The shafts 107, 112 and 114 have their upper ends journaled in a bracket 122 which extends from and is integral with the intermediate shelf 18.

Consequently, rotation of the carriage control shaft 66, which causes reciprocation of the carriage 47, will rotate both cams 100 and 101 to vary the position of the movable sliders of the potentiometers 106 and 105, respectively. One of the cams 100 or 101 may, for example, be shaped in accordance with the Mach number which is a function of the measured pressure ratio. The measured pressure ratio $P_t:P_s$ may be expressed as follows:

$$\frac{P_t}{P_s} = \left(1 + \frac{k-1}{2} M^2\right)^{\frac{k}{k-1}} \quad (1)$$

wherein $k$ is the ratio of the specific heat of the ambient air at constant pressure to the specific heat of the ambient air at constant volume. M is the Mach number which may be defined as follows:

$$M = \frac{V}{C}$$

and wherein V is the speed of the plane and C is the speed of sound through the ambient air.

The above Equation 1 may be transformed as follows:

$$M = \sqrt{\left[\left(\frac{P_t}{P_s}\right)^{\frac{k-1}{k}} - 1\right] \times \frac{2}{k-1}} \quad (2)$$

The pressure ratio $$\frac{P_t}{P_s}$$

is obtained by the transducer of the invention in the following manner. The bellows 23 is subjected to the pressure $(P_t - P_s)$, while the bellows 27 is subjected to the pressure $P_s$. If the distance between the two knife edges 38 and 41 is $c$, and the distance between the knife edge 41 and the pivot 45 is $a$, the following equation is obtained as a condition for balance of the beam 40:

$$(P_t - P_s) A a = P_s A (c - a) \quad (3)$$

wherein A is the effective area of each of the bellows which are assumed to be equal.

From Equation 3 we obtain:

$$\frac{P_t}{P_s} = \frac{1}{a} \times c \quad (4)$$

Since $c$, of course, is constant, the pressure ratio $$\frac{P_t}{P_s}$$

is directly proportional to $$\frac{1}{a}$$

Accordingly, Equation 2 may be rewritten as follows:

$$M = \sqrt{\left[\left(\frac{c}{a}\right)^{\frac{k-1}{k}} - 1\right] \times \frac{2}{k-1}} \quad (5)$$

Thus Equation 5 shows that the Mach number may be directly obtained from the variable $a$, which is the lever arm between pivot 45 and knife edge 41.

As explained hereinbefore, by means of the counterweights 77 and 78, it is possible to make the instrument insensitive to the effect of linear acceleration. For a better understanding of the principles of neutralizing the effect of linear acceleration, reference is now made to Fig. 5, which schematically illustrates the beam 40 with its movable pivot 45. Fig. 5 also illustrates the two bellows 23 and 27 and their connection with beam 40. Let it now be assumed that the center of gravity of the instrument, including the beam, the moving portions of the two bellows, their connections and associated mechanism, is at the point 125. When the instrument is subjected to linear acceleration, a force vector will be developed, which is shown by the arrow 126 and which may extend in the direction of the arrow. In order to neutralize the effect of such linear acceleration, another force vector 127 must be provided, which is of the same magnitude as and opposite in direction to the force vector 126. This may, for example, be accomplished by providing a counterweight 128 on a lever 130 having a fixed pivot point 131. The other arm of lever 130 is connected to a link 132 which is pivoted to the point 125, the center of gravity of the instrument. The linear acceleration which produces the force vector 126 will also develop a force vector 133 having the same direction as vector 126 and which has its origin in the counterweight 128. This force is transmitted through the lever 130 and link 132 to the center of gravity 125. All that is needed is a counterweight 128 having such a mass, and a linkage 130, 132 such that a force vector 127 is developed at the center of gravity 125 which substantially neutralizes or cancels the force vector 126.

It would be somewhat awkward to link a counterweight directly to the center of gravity of the beam 40, of the instrument of the present invention, because the carriage 47 will pass the center of gravity. Hence, in accordance with the present invention, the effect of acceleration may also be eliminated by the use of counterweights 77 and 78, as shown schematically in Fig. 6. It will be assumed again that the instrument subject to linear acceleration produces a force vector 135 in its center of gravity 136. This force vector 135 is neutralized or cancelled by the effect of the acceleration on the counterweights 77 and 78. The acceleration may be assumed to produce effective force vectors 137 and 138 on the counterweights 77 and 78 respectively. This force is transmitted from counterweight 77 through rod 80 to one end of beam 40 and from counterweight 78 through rod 85 to the other end of the beam. As explained hereinbefore, rod 80 has a fixed pivot point 81 and is connected through the self-aligning bearing 83 with the beam 40. Hence the rod 80 is permitted to tilt about its pivot 81 to move the beam 40 about the beam pivot 45. The same is true of rod 85 which has a fixed pivot 86 and is linked to the beam at 88 through a self-aligning bearing. The masses of counterweights 77 and 78 are such, and their linkages such that a force vector 140 is produced at the center of gravity 136 which is equal in magnitude and opposite in direction to the force vector 135 to neutralize the effect of linear acceleration.

Since the counterweights effectively act on the center of gravity 136 of the instrument, it will be obvious that it does not matter in which direction the linear acceleration acts. In other words, the instrument will be insensitive to linear acceleration regardless of the direction of acceleration. It will be understood that the compensation does not take care of angular acceleration, but this is an effect of secondary order and may be disregarded.

Figure 7:
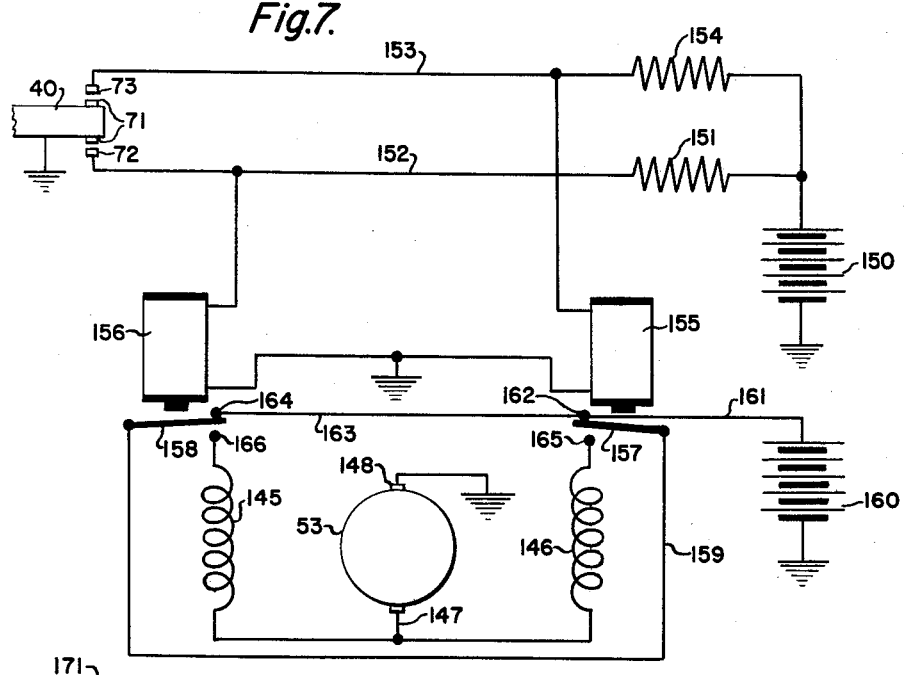
Fig. 7 is an electric circuit diagram of the control circuit for the electric motor for moving the beam pivot to rebalance the beam.

Referring now to Fig. 7, there is illustrated an electric circuit diagram of the electric motor 53, of the switches 71, 72, 73 for energizing the motor and of associated relays and circuit components. The electric motor 53 may be a direct current motor having two windings 145 and 146 connected to one terminal 147 of the motor, while the other motor terminal 148 may be grounded as shown. The motor may be caused to rotate in either direction by selectively causing current flow either through the winding 145 or through the winding 146.

A suitable source of voltage, such as battery 150, has one terminal grounded, while the other terminal is connected through resistor 151 and lead 152 to the fixed switch contact 72. The other fixed switch contact 73 is connected to the positive terminal of battery 150 through lead 153 and resistor 154. A relay 155 is connected between lead 153 and ground, as shown, while a relay 156 is connected between the lead 152 and ground. Accordingly, as long as the movable switch contact 71 is out of engagement with both fixed contacts 72 and 73, current will flow from battery 150 through resistor 154 and relay 155 to ground and also from the battery through resistor 151 and relay 156 to ground. The currents through the relays are large enough to hold closed their respective movable contacts 157 and 158 as illustrated. The electric motor 53 is energized by a battery 160 having one terminal grounded, while the other terminal is connected through lead 161 to the fixed contact 162 of relay 155 and further through lead 163 to the fixed contact 164 of the other relay 156. The two movable contacts 157 and 158 are interconnected through a lead 159. Hence, it will be obvious that with the relay contacts in the position shown in Fig. 7, the motor is not energized because the fixed contacts 165 and 166 of relays 155 and 156, respectively, which in turn are connected to the motor windings 146 and 145, are not connected to the battery.

Let it now be assumed that the beam 40 becomes unbalanced, due to change of the pressures acting on the bellows 23 and 27. Let it further be assumed that the unbalance is such that the movable contact 71 engages fixed contact 73. Since beam 40 is grounded as shown in Fig. 7, a current path is established from ground through battery 150, resistor 154, lead 153, contacts 73, 71 back to ground. Since the relay 155 is now bypassed by a low-impedance current path, the relay is de-energized permitting its movable contact 157 to engage the fixed contact 165. Consequently, the motor 53 is now energized through a path which may be traced from ground through battery 160, leads 161, 163, relay contacts 164, 158, lead 159, relay contacts 157, 165, motor winding 146 and motor 53 back to ground. This will cause rotation of the motor 53 in a predetermined direction, thereby to rotate worm 56, worm gear 57 on shaft 58, worm 63 and worm gear 64, shaft 66 and gear 59 which in turn engages rack 65 of carriage 47. The carriage will thus be moved until the movable pivot or shaft 45 again balances the beam.

If the pressures acting on the bellows 23 and 27 change in such a manner that beam 40 tilts in the opposite direction, movable contact 71 will engage fixed contact 72. Therefore, relay 156 is de-energized because lead 152 is grounded through contacts 72, 71 and beam 40 thus bypassing the relay. This in turn will permit the movable relay contact 158 to engage the fixed contact 166. The motor 53 is now energized through a circuit which may be traced from ground through battery 160, lead 161, contacts 162, 157, lead 159, contacts 158, 166, motor winding 145 and motor 53 back to ground. The motor thus rotates in the opposite direction causing movement of the carriage in the opposite direction until the beam is rebalanced again.

The electric circuit shown in Fig. 7 avoids heavy current flow through the contacts 71, 72, 73 which might cause arcing because resistors 151 or 154 limit the current flow through the switch. Furthermore, the relays 155 and 156 and their contacts are arranged in such a manner that it is impossible to cause, simultaneously, a current flow through both motor windings 145 and 146.

Figure 8:
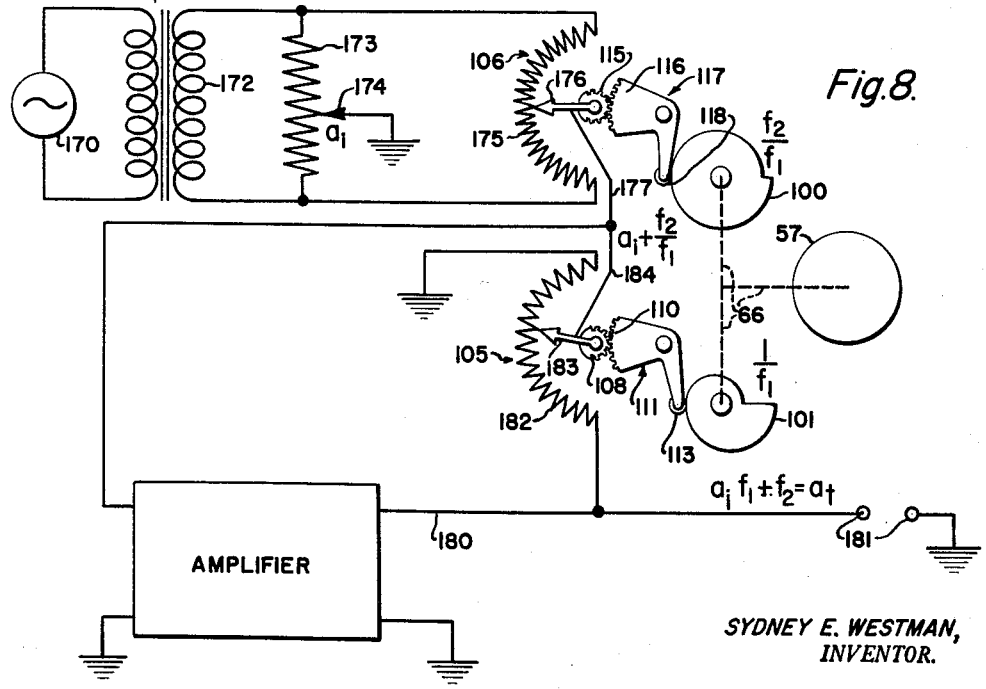
Fig. 8 is an electric circuit diagram illustrating, by way of example, an electric angle of attack analogue computer network which may be controlled by the transducer of the invention.

Fig. 8, to which reference is now made, illustrates by way of example an electric analogue computer for developing an output voltage representative of the true angle of attack and which utilizes the instrument of the present invention. The true angle of attack $a_t$ may be expressed as a function of the measured or indicated angle of attack $a_i$ which may be obtained from a conventional transducer responsive to the direction of the air stream in elevation. The measured or indicated angle of attack must be modified by functions of the Mach number, that is, functions of the measured pressure ratio. This relationship may be expressed as follows:

$$a_i f_1(M) + f_2(M) = a_t \qquad (6)$$

In the above formula $f_1(M)$ and $f_2(M)$ are predetermined functions of Mach number, that is, of the pressure ratio, which may be conveniently obtained by flight test of the particular airplane for which the instrument is intended. A voltage representative of $a_t$ may be obtained from the analogue computer shown schematically in Fig. 8.

The analogue computer network includes a source 170 of alternating voltage which must have a substantially constant voltage. Connected across the source 170 is a transformer 171 having a secondary winding 172. A resistor 173 is connected across the secondary winding 172. The resistor 173 has a variable tap 174 which is varied in accordance with $a_i$ by a suitable instrument which measures the relative direction of the air stream in elevation. Connected across resistor 173 is a resistor 175 forming part of the potentiometer assembly 106 and having a variable tap 176. The variable tap or slider 176 is positioned through motor 57, shaft 66, cam 100, cam follower 118, a gear segment 116 and pinion 115 in the manner previously explained. In the example shown in Fig. 8, the cam 100 is shaped in accordance with the function $$\frac{f_2}{f_1}$$

as indicated. The voltage obtained from lead 177 connected to variable tap 176 with reference to ground is representative of $$a_i + \frac{f_2}{f_1}$$

as will be well understood. In other words, the input voltage impressed on the secondary winding 172 is multiplied by $$\frac{f_2}{f_1}$$

by the potentiometer 106 and to this voltage there is added a voltage representative of $a_i$ by means of resistor 173 and its variable grounded tap 174.

The voltage obtained from lead 177 is amplified by amplifier 180 having output terminals 181. The amplifier 180 has a negative feedback path including the potentiometer assembly 105 which includes a resistor 182 connected across the amplifier output circuit and a variable tap 183 which is connected by lead 184 to the amplifier input circuit. The variable tap 183 is positioned in accordance with the function $$\frac{1}{f_1}$$

This is accomplished by shaping the cam 101 in accordance with the function $$\frac{1}{f_1}$$

as indicated. By means of the motor 57 and shaft 66, the cam 101 is positioned, which in turn positions variable tap 183 through cam follower 113, gear segment 110 and pinion 108 in the manner previously explained. In a manner well known, the output voltage obtained from the amplifier 180 is divided by means of the negative feedback path by a voltage representative of $$\frac{1}{f_1}$$

In other words, the input voltage of amplifier 180 obtained from lead 177 and which is representative of $$a_i + \frac{f_2}{f_1} \text{ is divided by } \frac{1}{f_1}$$

or multiplied by $f_1$, thereby to obtain $a_i f_1 + f_2 = a_t$. This voltage is obtained from the output terminals 181.

It will, of course, be understood that more than two cams may be provided in the instrument and that the cams may be shaped in accordance with different functions of the measured pressure ratio. Furthermore, it will be obvious that the pressure ratio may be directly indicated by the angular position of the shaft 66 or in any other suitable manner.

There has thus been disclosed a pressure ratio transducer which is insensitive to the effect of linear acceleration. The pressure ratio transducer measures directly the ratio of the total pressure of the ambient air to the static pressure of the ambient air or, in general, any force ratio to be measured. The measured force ratio may be transformed into an output voltage representative directly of the measured force ratio or of a predetermined function thereof, by means of cams for positioning potentiometers. It has been found by actual tests that the transducer of the invention has an error within 0.3% of the true pressure ratio at sea level and an error between 0.3% and 0.6% of the true pressure ratio at an altitude of 35,000 feet, the actual accuracy depending upon the speed of the plane and other factors.

What is claimed is:

1. A force ratio measuring instrument subject to linear acceleration, said instrument comprising a beam, a pivot for said beam, said pivot movable laterally of its axis relative to said beam, two forces exerting devices having means for applying force to said beam laterally of the axis of said pivot, whereby said beam becomes unbalanced in response to variations of the force exerted by at least one of said devices, and means for moving said pivot in response to unbalance of said beam and tending to rebalance said beam, means disposed to be actuated by said movable pivot for providing a measurement of the position of said movable pivot; and mechanism for rendering said instrument insensitive to the effects of linear acceleration regardless of movements of said pivot, said mechanism including a counterweight means connected to said beam, said counterweight means being disposed in such a manner so as to develop a force vector substantially equal and opposite to the force vector developed by the movable elements of said instrument in response to linear acceleration, the force vector of said counterweight means in addition substantially coinciding with the center of gravity of the movable elements of said instrument.

2. A force ratio measuring instrument subject to linear acceleration, said instrument comprising a beam, a pivot for said beam, said pivot movable laterally of its axis relative to said beam, two force exerting devices having means for applying force to said beam laterally of the axis of said pivot, whereby said beam becomes unbalanced in response to variations of the force exerted by at least one of said devices, switch means on said beam, and an electric motor controlled by said switch means for moving said pivot in response to unbalance of said beam and tending to rebalance said beam, means disposed to be actuated by said movable pivot for providing a measurement of the position of said movable pivot; and mechanism for rendering said instrument insensitive to the effects of linear acceleration regardless of movements of said pivot, said mechanism including a counterweight means connected to said beam, said counterweight means being disposed in such a manner so as to develop a force vector substantially equal and opposite to the force vector developed by the movable elements of said instrument in response to linear acceleration, the force vector of said counterweight means in addition substantially coinciding with the resulting force vector of the movable elements of said instrument.

3. An instrument for measuring the ratio of two pressures, said instrument being subject to linear acceleration and comprising a beam, a movable pivot for said beam, first and second devices, each being responsive to one of the pressures to be measured, said devices having means for applying force to said beam laterally of the axis of said pivot for exerting a force on said beam which varies with variations of the pressures, thereby to unbalance said beam, a motor for moving said pivot, switch means disposed to be actuated by said beam for energizing said motor in response to unbalance of said beam until said beam is balanced again, means disposed to be actuated by said movable pivot for providing a measurement of the position of said movable pivot; and mechanism for compensating for the effect of linear acceleration on said instrument regardless of movements of said pivot, said mechanism including a counterweight means connected to said beam, said counterweight means being disposed so as to develop a force vector substantially equal and opposite to the force vector developed by the movable elements of said instrument in response to linear acceleration, the force vector of said counterweight means in addition substantially coinciding with the center of gravity of the movable elements of said instrument.

4. An instrument for measuring the ratio of two pressures adapted to be insensitive to effects of linear acceleration comprising a beam, a pivot for said beam movable laterally of its axis relative to said beam, a first and second device, each of said devices being responsive to one of the pressures and having means for applying force indicative of the pressure to which it responds to said beam laterally of the axis of said pivot such that said beam becomes unbalanced in response to variations of the force exerted by at least one of the devices, means disposed to be actuated in response to the unbalance of said beam for moving said pivot until said beam is rebalanced, means disposed to be actuated in response to movement of said pivot for providing an indication representative of the position of said pivot relative to said beam, and mechanism for rendering said instrument insensitive to the effects of linear acceleration irrespective of the position of said pivot relative to said beam, said mechanism including at least one counterweight and lever means for said counterweight, said lever means being pivotally mounted intermediate its ends, said counterweight being carried by said lever means on one side of said pivotal mounting, and means connecting said lever means to said beam on the side of said pivotal mounting opposite said counterweight to apply to said beam, for a particular linear acceleration, a force vector developed by said counterweight and lever means substantially equal in magnitude and opposite in direction to the force developed, for such linear acceleration, by the movable elements of said instrument at the center of gravity of such movable elements.

5. An instrument as recited in claim 4 wherein said mechanism includes a lever with at least one counterweight adjustably mounted adjacent one end thereof and the means pivotally connecting the lever to said beam is connected at substantially the center of gravity of said beam and other movable elements of said instrument.

6. An instrument as recited in claim 4 wherein said mechanism includes a first lever and counterweight carried thereby with means pivotally connecting the end of said first lever to one end portion of said beam, and a second lever and counterweight carried thereby with means pivotally connecting the end of said second lever to the opposite end portion of said beam.

7. A pressure transducer for measuring the ratio of the total pressure of the ambient air to the static pressure of the ambient air adapted to be insensitive to effects of linear acceleration comprising an airtight housing, means for transmitting the static air pressure to the interior of said housing, an evacuated bellows in said housing and subject to the static air pressure, a second bellows in said housing, means for transmitting the total air pressure to the interior of said second bellows whereby said second bellows is subjected to the difference between the total and the static air pressures, a beam in said housing, a carriage reciprocable in said housing along the longitudinal axis of said beam and having a rotatable pivot element for said beam, means for connecting each of said bellows to one end portion of said beam whereby said beam becomes unbalanced in response to variations of said pressures, switch means positioned to be actuated in response to the unbalance of said beam, an electric motor coupled to effect reciprocation of said carriage along said beam, said switch means being connected to energize said motor in response to unbalance of said beam to shift said carriage until said beam is rebalanced, means disposed to be actuated in response to movement of said pivot element for providing an indication representative of the position of said pivot element relative to said beam, and mechanism for rendering said instrument substantially insensitive to the effects of linear acceleration irrespective of the position of said pivot element relative to said beam, said mechanism including at least one counterweight and lever means for said counterweight, said lever means being pivotally mounted intermediate its ends, said counterweight being carried by said lever means on one side of said pivotal mounting and means connecting said lever means to said beam on the side of said pivotal mounting opposite said counterweight to apply to said beam, for a particular linear acceleration, a force vector developed by said counterweight and lever means substantially equal in magnitude and opposite in direction to the force vector developed, for such linear acceleration, by the movable elements of said instrument at the center of gravity of such movable elements.

8. A pressure transducer as recited in claim 7 wherein said means actuated in response to movement of said pivot element includes a shaft, gear means providing a driving connection between said shaft and said carriage, at least one cam on said shaft, said cam being shaped in accordance with a predetermined function of said pressure ratio, potentiometer means, and means coupling said cam to said potentiometer means for adjustment thereof to derive an output voltage from said potentiometer means representative of said function.

References Cited in the file of this patent

UNITED STATES PATENTS

| 1,287,860 | Bristol | Dec. 17, 1918 |
| 2,034,909 | Kollsman | Mar. 24, 1936 |
| 2,441,468 | Brownscombe | May 11, 1948 |
| 2,487,310 | Chandler | Nov. 8, 1949 |
| 2,598,681 | Garbarini | June 3, 1952 |
| 2,599,288 | Schaefer | June 3, 1952 |
| 2,665,499 | Cloud | Jan. 12, 1954 |

UNITED STATES PATENT OFFICE
CERTIFICATE OF CORRECTION

February 2, 1960

Patent No. 2,923,153

Sydney E. Westman

It is hereby certified that error appears in the printed specification of the above numbered patent requiring correction and that the said Letters Patent should read as corrected below.

Column 5, line 68, Equation (3) should appear as shown below instead of as in the patent:

$$(P_t - P_s)Aa = P_s A(c-a)$$

column 7, line 10, for "switches" read -- switch --; column 9, line 53, for "forces" read -- force --.

Signed and sealed this 2nd day of August 1960.

(SEAL)
Attest:

KARL H. AXLINE
Attesting Officer

ROBERT C. WATSON
Commissioner of Patents